INVENTORS
William S. Kunzler
and Clarence W. Robertshaw.
BY
THEIR ATTORNEY

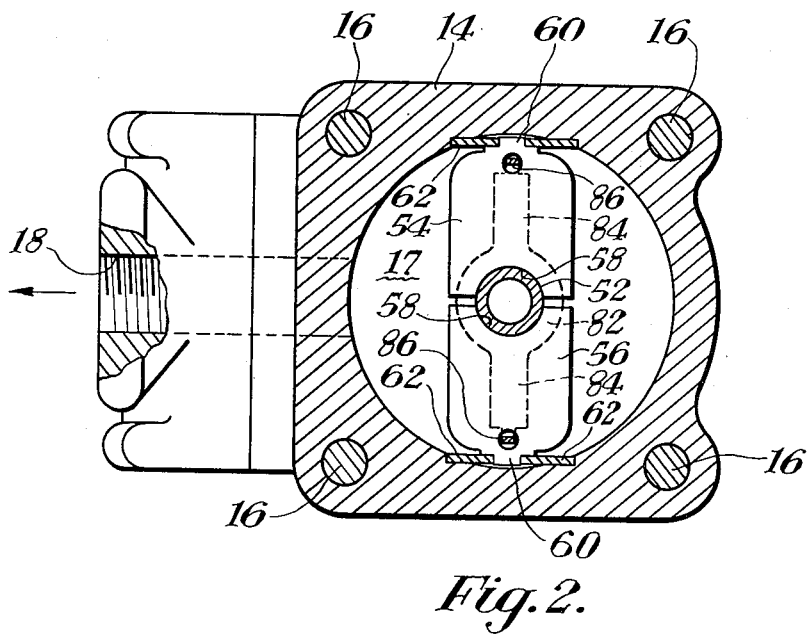
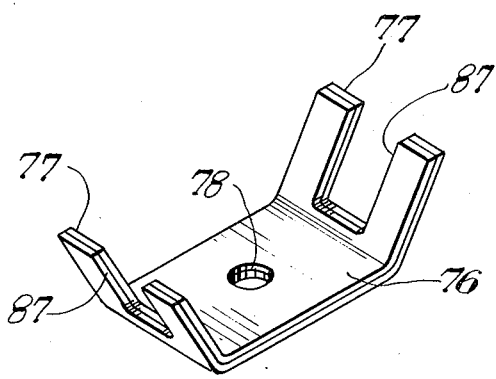
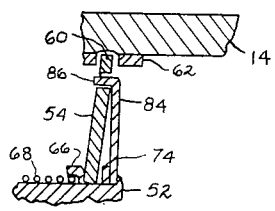

United States Patent Office 2,822,134
Patented Feb. 4, 1958

2,822,134

THERMOSTATIC REGULATOR

William S. Kunzler and Clarence W. Robertshaw, Greensburg, Pa., assignors to Robertshaw-Fulton Controls Company, Greensburg, Pa., a corporation of Delaware Application April 22, 1954, Serial No. 424,989

9 Claims. (Cl. 236—99)

This invention relates to thermostatic regulators for fluid fuel burning appliances and more particularly to thermostatically actuated fuel regulating valves.

In devices of this character using an expansible power element as part of the thermostatic control, it is desirable to arrange the power element in axial alignment with the valve member which it actuates so that the parts of the device may be incorporated in a minimum space. In the past, devices utilizing such axial arrangement of parts have had the expansible element connected directly to the valve element to transmit movement directly thereto and, as a result, substantial throttling of the fuel supply occurred as the control temperature was approached.

It is an object of this invention to improve the operation of thermostatic regulators having axially aligned valves and expansible power elements by reducing the throttling of fuel as the control temperature is approached.

Another object of this invention is to amplify the movement of the expansible power element while maintaining the axial arrangement of parts.

Another object of this invention is to incorporate a lever system between a valve member and an expansible power element axially aligned therewith for effecting substantial movements of the valve member in response to small increments of movement of the expansible member and incorporating the entire mechanism in a space no larger than that required by devices of the prior art.

Other objects and advantages will appear from the following specification taken in connection with the accompanying drawings wherein:

Fig. 2 is a section taken on the line II—II of Fig. 1;

Fig. 3 is a perspective view of a detail; and

Fig. 4 is a fragmentary sectional view of a detail.

Figure 1:
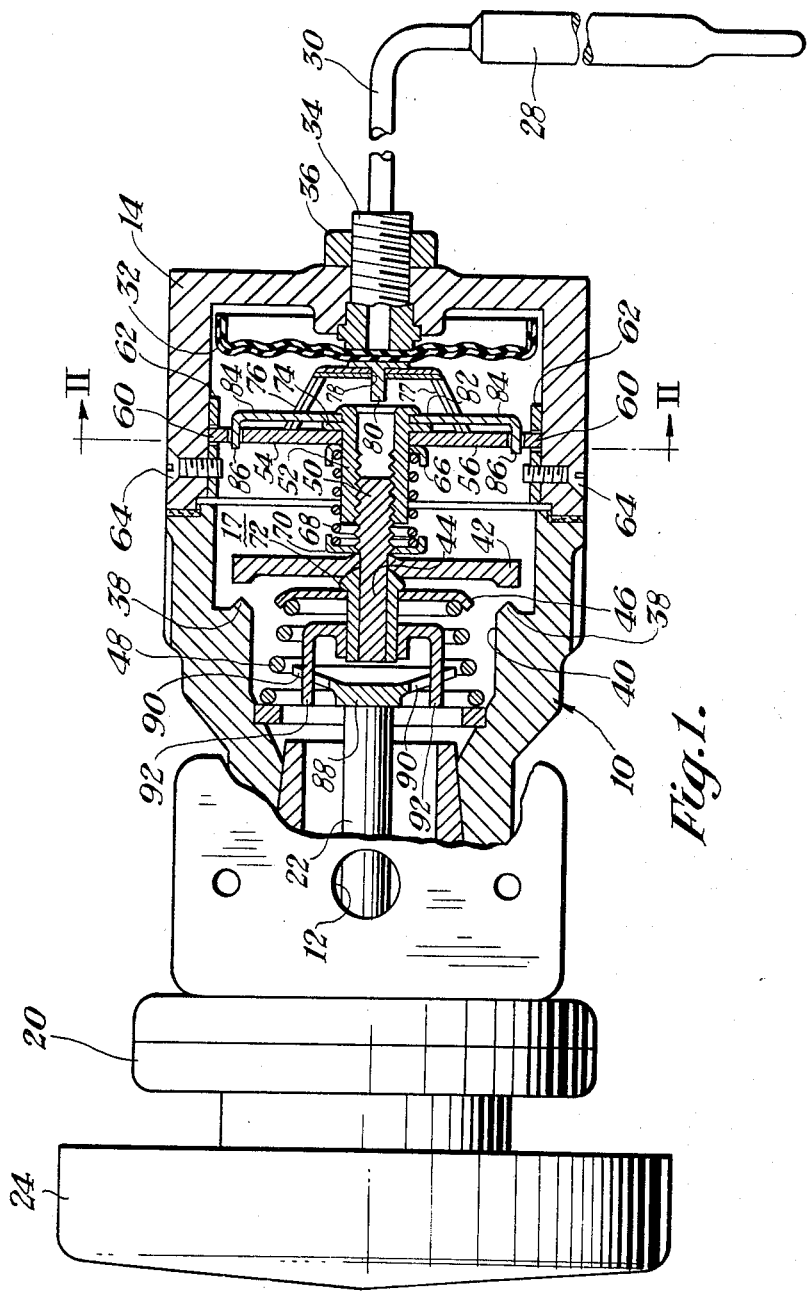
Fig. 1 is an elevation, partly in section, of a thermostatic valve embodying the invention.

Referring more particularly to the drawings, the thermostatic valve includes a main casing 10 provided with an inlet 12 for fluid fuel and having an end casing 14 detachably secured thereto by screws 16. The end casing 14 is generally cup-shaped and forms, with the interior of the main casing 10, a valve chamber 17 which communicates with the inlet 12 and an outlet 18 formed in the end casing 14. The end of the main casing 10 opposite the end casing 14 carries a cap 20 forming a support for an operating shaft 22 and usual dial 24.

The thermostatic valve thus far described is designed to be housed behind the front panel of a domestic gas range with the dial 24 projecting through such panel for convenient operation. The thermal control assembly for the device in this arrangement comprises a bulb 28 which is adapted to be located in the oven of the range and connected through a capillary tube 30 to the interior of an expansible and contractible power element 32 disposed within the end casing 14.

As is customary in devices of this type, the power element 32 carries a hollow stud 34 which extends through a suitable aperture in the bottom wall of the end casing 14. A nut 36 is threaded on the stud 34 to secure the power element 32 to the end casing 14. The assembly of the bulb 28, tube 30 and power element 32 is filled with a suitable fluid which, upon changes in temperature sensed by the bulb 28, will serve to expand and contract the power element 32 in a manner well known in the art.

An annular valve seat 38 is formed on the casing 10 within the valve chamber 17 and defines a valve port 40 through which fluid fuel may flow from the inlet 12 to the outlet 18. A disk-shaped valve member 42 is located in the valve chamber 17 to be reciprocable into and out of engagement with the valve seat 38, and is loosely mounted on a reciprocable and rotatable valve stem 44. The valve stem 44 carries a spring retainer 46 which engages a coil spring 48 seated on the casing 10 for the purpose of biasing the valve member 42 away from the valve seat 38. One end 50 of the valve stem 44 projects through the valve member 42 and is threaded for reception in an internally threaded tubular adjusting element 52.

The tubular adjusting element 52 is disposed centrally of the valve chamber 17 along the common axis of the valve seat 38 and the power element 32 and is retained in such position by a plurality (in this instance two) of levers 54, 56. The levers 54, 56 are diametrically opposed to each other and are disposed substantially normal to the axis of the valve seat 38 and power element 32. The inner end of each of the levers 54, 56 is provided with a substantially semi-circular recess 58 which coacts to define a substantially circular opening between the juxtaposed ends of the levers 54, 56 and through which the tubular adjusting element 52 extends.

The outer end of each of the levers 54, 56 is provided with a lug 60 and each lug 60 is seated in a suitable aperture respectively formed in a pair of oppositely disposed plates 62 which are secured to the inner wall of the end casing 14 by screws 64. The apertures in the plates 62 are of sufficient size to permit pivotal movement of the lever arms 54, 56 about their outer ends for a purpose which will more fully appear hereinafter. It will be understood that the plates 62 may be dispensed with, if desired, and the levers 54, 56 pivoted directly on the end casing 14.

A washer 66 is loosely mounted on the tubular adjusting element 52 in engagement with the inner ends of the levers 54, 56 to form a seat for a spring 68 which encircles the tubular element 52 and engages a second washer 70 slidably mounted on the valve stem 44 contiguous the valve member 42. The spring 68 thus biases the valve member 42 and the inner ends of the levers 54, 56 away from each other, normally holding the valve member 42 in engagement with a shoulder 72 formed on the valve stem 44 and holding the inner ends of the levers 54, 56 in engagement with a flange 74 formed on the tubular element 52.

As is illustrated in Fig. 4, the lug 60 on lever 54 (and likewise lever 56) pivots within the confines of the aperture in plate 62 to cause axial movement of the assembly of the valve stem 44, valve member 42, adjusting element 52, spring 68 and washers 66, 70 as a unit. Thus, Fig. 4 shows the position assumed by lever 54 in response to expansion of power element 32. However, in the event that pivotal movement of the levers 54, 56 moves the valve member 42 into engagement with the valve seat 38, and the levers 54, 56 are subjected to additional pivot movement, the valve member 42, valve stem 44, and tubular adjusting element 52 will stop while the washer 66 will continue to move with the levers 54, 56 causing mere compression of the spring 68 without subjecting the other parts of the apparatus to excessive stresses.

To impart the aforementioned pivotal movement to the levers 54, 56, means is provided for connecting the medial portions thereof to the power element 32. This means is here shown as a generally U-shaped thrust element 76 formed of a material which is preferably deformable in response to variations in ambient temperatures. Such material may be the well-known bimetal comprising a pair of superposed metallic layers having different coefficients of thermal expansion and adapted to warp upon variations in ambient temperatures. This warping serves to compensate for expansion or contraction of the power element resulting from temperature changes at a point remote from the bulb 28 and maintains accurate calibration of the thermostat without regard to the temperature of the atmosphere surrounding the casing 10, 14.

The bight portion of the U-shaped thrust element 76 is provided with a centrally located aperture 78 through which a pintle 80, secured to the movable portion of the power element 32, is adapted to extend. The bight portion of the thrust element 76 is seated on the movable portion of the power element 32 and the end portions 77 thereof extend respectively into engagement with the medial portions of the levers 54, 56. Thus, upon expansion of the power element 32, the thrust element 76 is moved bodily toward the valve seat 38 to pivot the levers 54, 56 about the lugs 60 thereby moving the assembly of the valve stem 44, valve member 42, tubular element 52 and spring 68 toward the valve seat 38. The end portions 77 of the thrust element 76 preferably engage the levers 54, 56 near the center thereof to effect amplification of the movement of the power element 32 and cause movement of the valve member 42 through approximately twice the distance through which the movable portion of the power element 32 moves.

To set the temperature which the control device will maintain, the effective length of the connection between the valve member 42 and the inner ends of the levers 54, 56 is adjusted. To this end, detent means in the form of a plate 82 of relatively flexible material is secured to the end of the tubular adjusting element 52 adjacent the thrust element 76. The plate 82 is provided with a pair of laterally extending projections 84 each of which has an upturned end portion 86 seated in suitable apertures formed in the levers 54, 56 respectively. The detent plate 82 thus prevents rotation of the tubular adjusting element 52 but is capable of flexing to permit axial movement of the tubular adjusting element 52 relative to the casing 10, 14. To assure free movement of the thrust element 76, the end portions 77 thereof are provided with relieved portions or notches 87 through which the projections 84 are adapted to expand.

A slidable torque transmitting connection is provided between the valve stem 44 and the operating shaft 22. This connection is effected through a flange 88 secured to the operating shaft 22 and provided with radially extending slots 90. A pair of tangs 92 is secured to the end of the valve stem 44 opposite the threaded end 50 thereof to extend slidably through the slots 90 in the flange 88. Thus, the knob 24 may be turned to rotate the operating shaft 22 and thereby rotate the valve stem 44 relative to the adjusting element 52. This will screw the threaded portion 50 of the valve stem 44 into or out of the tubular adjusting element 52 to regulate the distance through which the valve member 42 must be moved to engage the seat 38.

In the operation of the device, the dial 24 is rotated to any desired setting. This rotation serves to screw the threaded portion 50 of the valve stem 44 into the tubular element 52 and causes movement of the valve member 42 away from the seat 38 under the bias of the spring 48. Fuel may then flow from the inlet 12 through the valve port 40 and through the outlet 18 to the point of use, such as the oven of a domestic gas range.

When the temperature of the oven, as sensed by the bulb 28, approaches that for which the dial 24 has been set, the power element 32 expands, forcing the thrust element 76 to the left as viewed in Fig. 1. Due to the fact that the spring 68 is stronger than the spring 48, the latter is compressed and the valve member 42 moves toward its seat 38, the spring 68 retaining the inner ends of the levers 54, 56 in the same relationship with the tubular element 52 as they occupied before the expansive movement of the power element 32 occurred.

When the temperature sensed by the bulb 28 reaches the temperature selected by the setting of the dial 24, the valve member 42 engages the seat 38 to prevent fuel flow through the valve chamber 17. It will be apparent that the final stages of movement of the valve member 42, prior to actual seating, will cause throttling of the fuel supply. However, since the ratio of movement of the valve member 42 to movement of the movable portion of the power element 32 is approximately 2:1, substantial throttling of the fuel supply is deferred until the expansible power element 32 is expanded to substantially the degree necessary to effect seating of the valve member 42. Thus, a substantial amount of fuel continues to flow to the oven until the control temperature is actually attained and the control temperature is established in a shorter period of time than that possible with devices of the prior art wherein the valve member was movable bodily with the movable portion of the power element.

In the event that the power element 32 expands beyond the degree necessary to effect seating of the valve member 42, as a result of what is known in the art as "overshooting," the thrust element 76 continues to impart pivotal movement to the levers 54, 56 but such pivotal movement will cause only compression of the spring 68 without danger of damaging any of the working parts.

When the temperature sensed by the bulb 28 drops below the temperature set by the dial 24, the power element 32 contracts, permitting the valve member 42 to move away from the valve seat 38 under the bias of the spring 48. Since the 2:1 ratio of movement between the valve member 42 and the power element 32 still obtains, slight contraction of the power element 32 will permit substantial movement of the valve member 42 and establish substantial fuel flow to the oven. Accordingly, a relatively large amount of heat will be immediately available in the oven to restore the control temperature in a minimum period of time and accurate maintenance of the control temperature is assured.

An important feature of this invention is the fact that while the motion transmitted from the power element 32 to the valve member 42 is considerably amplified, the mechanism for effecting such amplification is utilized for guiding the valve stem and is incorporated in a casing no larger than that required in devices of the prior art having a direct connection between the power element and the valve member.

Although a preferred embodiment of the invention has been shown and described herein, it is to be understood that the invention is not limited to the details of construction and arrangement of parts disclosed but is to be interpreted as claimed.

It is claimed and desired to secure by Letters Patent:

1. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an element movable axially relative to said valve seat and said valve member, a plurality of rotatable lever arms in said chamber, each of said lever arms being pivoted on said casing and disposed substantially normal to the axis of said valve seat, normally unyieldable resilient means positioned between and directly engaging said valve member and said lever arms and being operable to impart movement to said valve member upon rotation of said lever arms, said resilient means being yieldable when said valve member engages said seat to thereby permit further rotation of said lever arms without a corresponding movement of said valve member, and means operatively connecting said movable element of said thermally responsive means to a medial portion of each of said lever arms for imparting rotation thereto.

2. A thermostatic regulator as claimed in claim 1 wherein said last named means comprises a thrust element deformable in response to variations in ambient temperatures.

3. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an expansible element axially aligned with said valve seat and said valve member, a valve stem movable with said valve member and extending toward said expansible element, a plurality of rotatable lever arms in said chamber pivotally connected to said casing and disposed substantially normal to the axis of said valve seat, said lever arms operatively connected to and supporting one end of said valve stem, normally unyieldable resilient means extending between and directly engaging said valve member and said lever arms and being operable to impart movement to said valve member upon rotation of said lever arms, said resilient means being yieldable when said valve member engages said seat to thereby permit further rotation of said lever arms without a corresponding movement of said valve member, and means operatively connecting said expansible element to a medial portion of each of said lever arms.

4. A thermostatic regulator as claimed in claim 3 wherein said last named means comprises a bimetallic thrust element.

5. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an expansible element axially aligned with said valve seat and said valve member, a valve stem movable with said valve member and extending toward said expansible element, a plurality of rotatable lever arms in said chamber, each of said lever arms being pivoted at one end on said casing and disposed substantially normal to the axis of said valve seat, a valve member adjustment means carried by said valve stem and extending toward said expansible element, said adjustment means operatively connected to and supported by the opposite end of each of said lever arms, normally unyieldable resilient means extending between and directly engaging said valve member and said lever arms and being operable to impart movement to said valve member upon rotation of said lever arms, said resilient means being yieldable when said valve member engages said seat to thereby permit further rotation of said lever arms without a corresponding movement of said valve member, and means operatively connecting said expansible element to a medial portion of each of said lever arms for imparting rotation thereto.

6. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an expansible element axially aligned with said valve seat and said valve member, a plurality of lever arms in said chamber, each of said lever arms being pivoted at one end on said casing and disposed substantially normal to the axis of said valve seat, a rotatable valve stem axially movable with said valve member and having a threaded portion, an adjusting element threaded on said portion, at least one laterally extending detent member carried by said adjusting element and operatively connected to at least one of said lever arms for preventing rotation of said adjusting element, yieldable means operatively connected to said valve stem for holding the other ends of said levers in operative engagement with said adjusting element, and means operatively connecting said expansible element to a medial portion of each of said lever arms, said means being adapted to compensate for variations in ambient temperatures.

7. A thermostatic regulator as claimed in claim 6 wherein said last named means comprises a bimetallic thrust element deformable in response to variations in ambient temperatures.

8. A thermostatic regulator as claimed in claim 7 wherein said thrust element is generally U-shaped in section with the bight portion thereof operatively engaging said expansible element and the end portions thereof engaging said lever arms respectively.

9. A thermostatic regulator as claimed in claim 8 wherein at least one of said end portions includes a relieved portion for receiving said detent member.

References Cited in the file of this patent

UNITED STATES PATENTS

| | | |
|---|---|---|
| 1,744,465 | Grayson | Jan. 21, 1930 |
| 2,045,289 | Bolin | June 23, 1936 |
| 2,123,829 | Grayson | July 12, 1938 |
| 2,237,399 | Waddell | Apr. 8, 1941 |
| 2,307,636 | Newell | Jan. 5, 1943 |
| 2,642,309 | Wasser | June 16, 1953 |
| 2,656,984 | Caparone | Oct. 27, 1953 |